No. 816,598. PATENTED APR. 3, 1906.
A. A. PHIPPS.
DISPLAY APPARATUS.
APPLICATION FILED APR. 25, 1905.

5 SHEETS—SHEET 1.

Witnesses
Paul L. Schmechel
M. A. Kiddie

Inventor
Abner A. Phipps
by Wm. O. Belt
Atty.

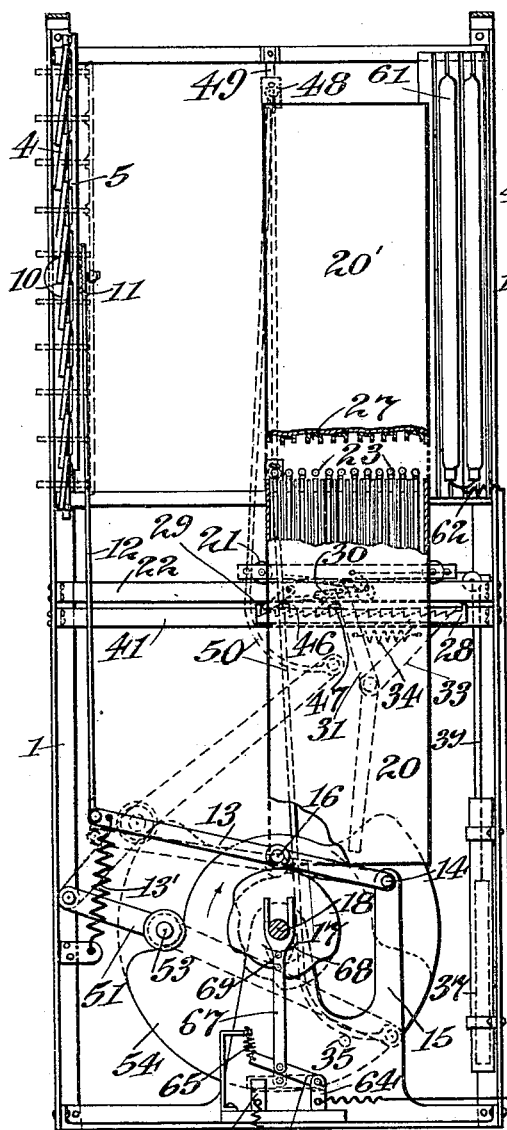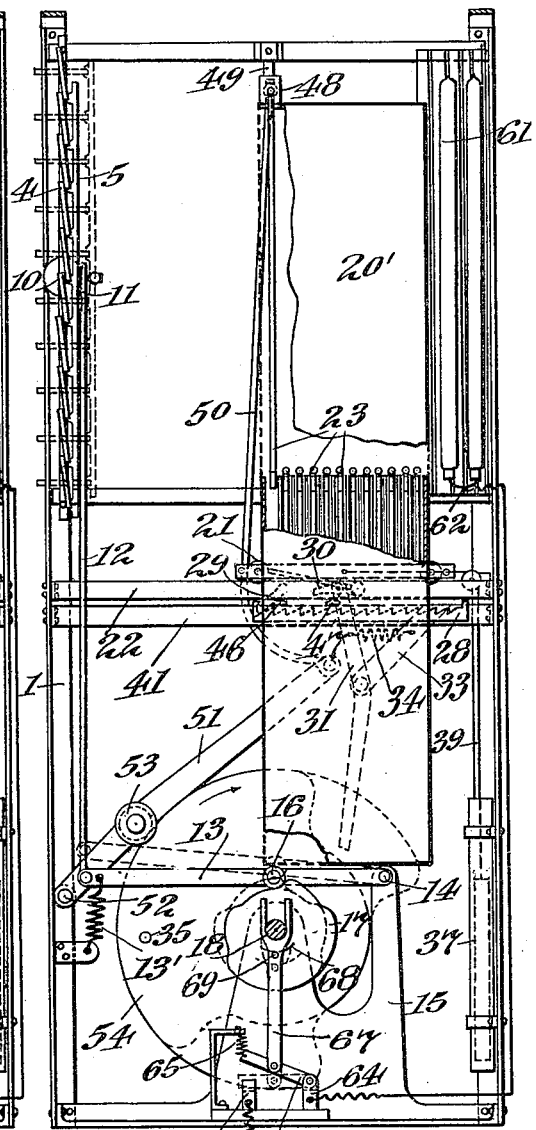

No. 816,598. PATENTED APR. 3, 1906.
A. A. PHIPPS.
DISPLAY APPARATUS.
APPLICATION FILED APR. 25, 1905.

5 SHEETS—SHEET 3.

Witnesses:-
Paul L. Schmechel
M. A. Kiddie

Inventor
Abner A. Phipps
by Wm. F. Belt
Atty

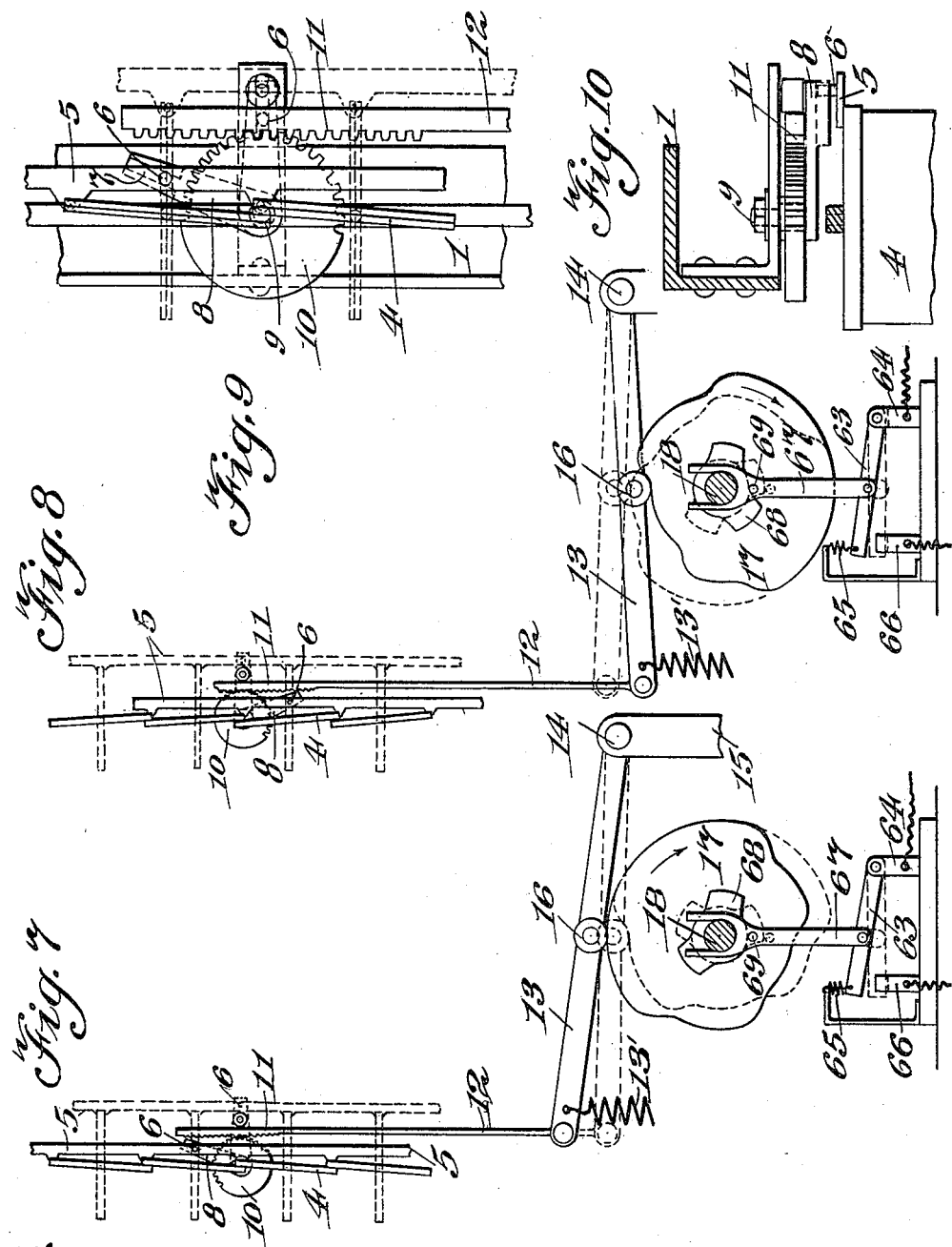

No. 816,598. PATENTED APR. 3, 1906.
A. A. PHIPPS.
DISPLAY APPARATUS.
APPLICATION FILED APR. 25, 1905.
5 SHEETS—SHEET 5.
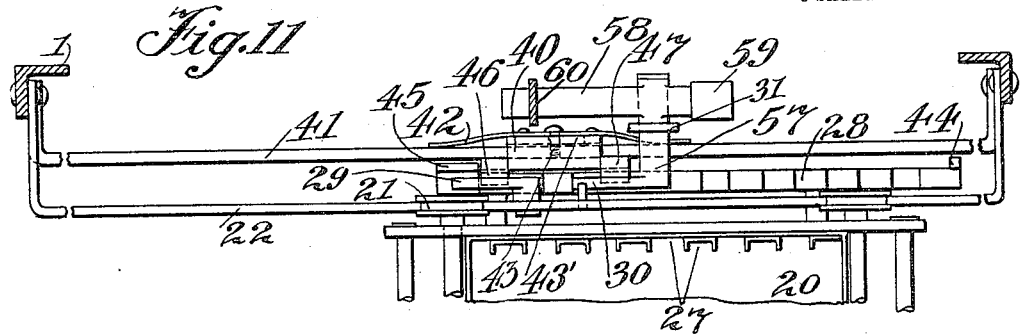
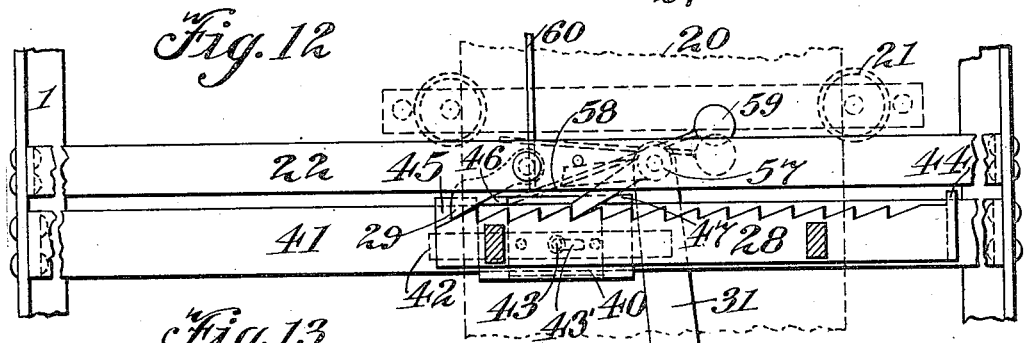
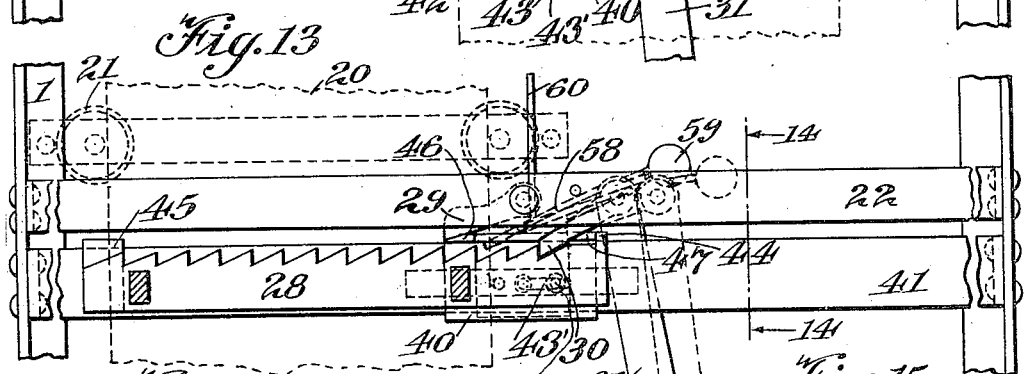
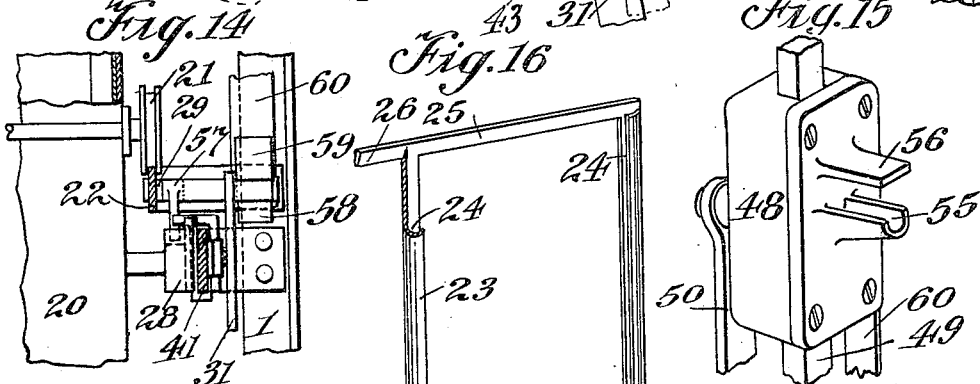
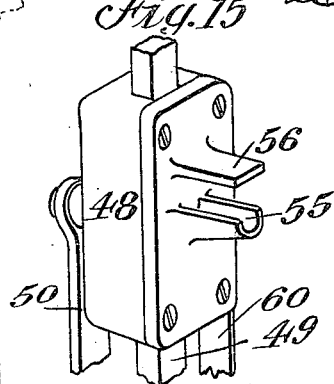
Witnesses:—
Paul L. Schmuckel
M. A. Kiddie
Inventor
Abner A. Phipps
by Wm. Belt
Atty

UNITED STATES PATENT OFFICE.

ABNER A. PHIPPS, OF NEW YORK, N. Y., ASSIGNOR TO ROBERT CARR, OF OAK PARK, ILLINOIS.

DISPLAY APPARATUS.

No. 816,598.      Specification of Letters Patent.      Patented April 3, 1906.

Application filed April 25, 1905. Serial No. 257,354.

*To all whom it may concern:*

Be it known that I, ABNER A. PHIPPS, a citizen of the United States, residing at New York city, in the county of New York and State of New York, have invented new and useful Improvements in Display Apparatus, of which the following is a specification.

The object of this invention is to provide a machine of simple construction and automatic action for displaying a series of picture one at a time with a kaleidoscopic effect and in a manner calculated to excite the curiosity and interest of a spectator.

The apparatus is inclosed ordinarily within a casing of suitable character; but as this forms no part of the present invention and can be made up in any style and shape desired I have omitted it in illustrating the embodiment of the invention in the accompanying drawings, in which—

Figure 1:
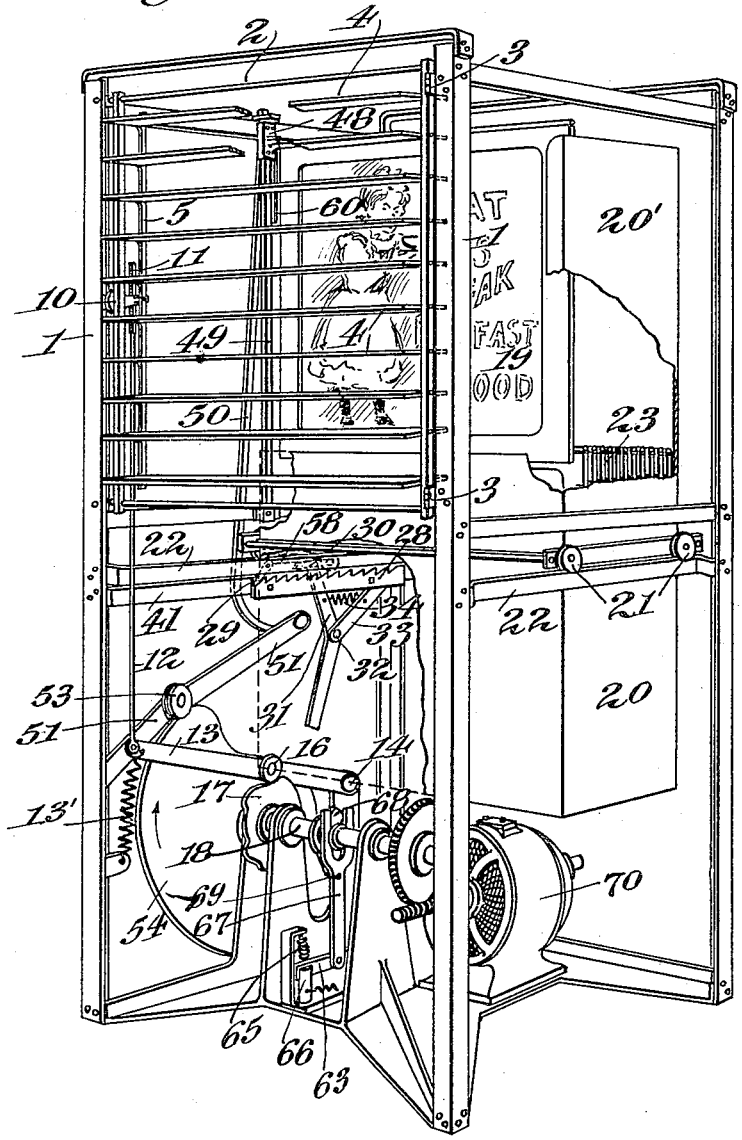

Figure 1 is a perspective view of the apparatus. Figs. 2, 3, 5, and 6 are side elevations, partly in section, and showing the carriage partly broken away and illustrating different positions of the movable parts. Fig. 4 is a diagrammatic view illustrating the several positions assumed by the mirrors. Figs. 7 and 8 are detail views showing the mechanism for operating the mirrors. Fig. 9 is an enlarged detail view of the rack and pinion devices for operating the mirrors. Fig. 10 is a top plan view of the parts shown in Fig. 9. Fig. 11 is a top plan view, partly in section, of the carriage-feeding means. Figs. 12 and 13 are side elevations, partly in section, showing the carriage-feeding means in its initial and extreme forward positions, respectively. Fig. 14 is a sectional view on the line 14 14 of Fig. 13. Fig. 15 is a detail enlarged perspective view of the lifter. Fig. 16 is a detail view of the picture-frame.

The main frame 1 is preferably made in skeleton form for lightness, and I have found it convenient to make this frame largely of angle-irons. The mirror-frame 2 is hinged at 3 to the main frame, and the mirrors 4 are pivotaly mounted at the center of their ends in parallel relation in said frame. These mirrors are preferably flat and rectangular in shape and double-faced, so that they will reflect the picture from either face. A bar 5 is pivotally connected to each of the mirrors at one edge thereof and is provided with a pin 6, which is arranged to work in a guideway 7 on an arm 8, mounted on the stud 9, carried by the main frame. This stud also carries the segment-gear 10, which meshes with a rack 11 on the operating-rod 12, and this rod is connected to one end of a lever 13, Fig. 7, which is pivoted at 14 on a standard 15 and carries a roller 16, held in operative engagement with a cam 17 on the main shaft 18. This cam is so timed that in a complete operation of the machine the mirrors will be moved from closed position, as shown in full lines in Fig. 7, to open position, as shown in broken lines, and then to closed position, as shown in full lines in Fig. 8, after which the movement is reversed and the mirrors are turned to open position, as shown in broken lines in Fig. 8, and then to closed position, as shown in full lines in Fig. 7.

The pictures 19 are carried in a carriage 20, which is provided with grooved rollers 21, arranged to travel on rails 22. These pictures are preferably painted, printed, or otherwise made on translucent material and each is mounted in an independent frame 23, Fig. 16. This frame is provided with a groove 24 in its sides and bottom, so that the picture can be easily inserted in and removed from the frame. The top bar 25 of the frame is preferably solid to provide sufficient weight for returning the frame and picture by gravity from display position to storage position in the carriage, and one end of this top bar is extended beyond the side of the frame in the form of a projection 26 for the purpose hereinafter described.

A plurality of pictures is stored upright in the carriage, generally speaking, below the movable mirrors, and one side 20' of the carriage is extended upward and provided with channels 27 throughout its length to form guides for the pictures in their movement to and from display position.

Figure 5:
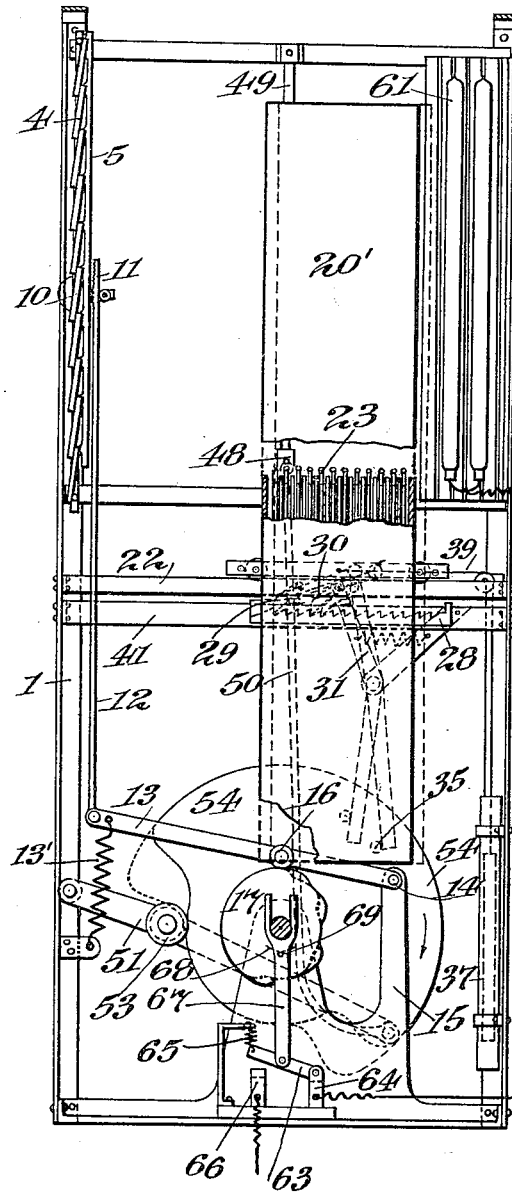
Figure 6:
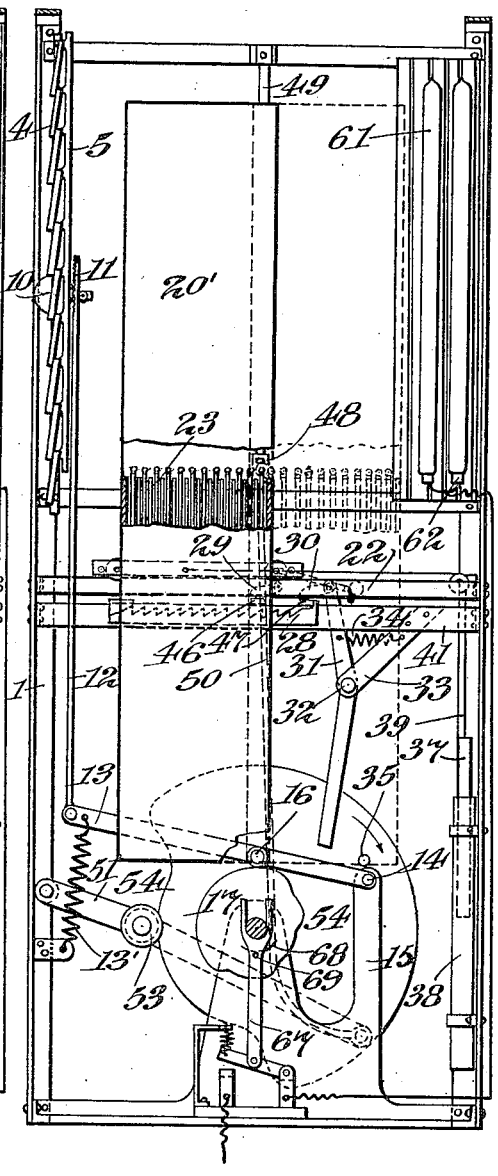

The carriage is moved forward a step after each complete display operation, and after all of the pictures have been displayed the carriage is returned to its initial position, Fig. 5, in one operation. The feeding means is illustrated in detail in Figs. 11 to 14, and referring thereto a rack 29 is mounted in a suitable manner on one side of the carriage and preferably at a distance slightly removed therefrom. A locking-pawl 28 is pivotally mounted on the rail 22 and operates by gravity in engagement with the rack. A feed-pawl 30 is pivotally mounted on the upper end of a lever 31, which is pivoted at 32 on an arm 33, fastened to the frame. This feed-pawl and lever are held normally in retracted position by a spring 34, Fig. 6, and the lever is operated by a pin 35 on the cam 54, which is mounted on the main shaft. This cam is timed to swing the lever forward and cause the feed-pawl to engage the rack and force the carriage forward one tooth corresponding to one picture in the carriage after each complete display operation, so that another picture will be brought into position to be carried into display position. The locking-pawl prevents reverse movement of the carriage, which is constantly under the tension of a weight 37, operating in a tube 38 and connected with the carriage by a cord 39. To permit the carriage to return to its initial position at the rear of the frame after all the pictures have been displayed, I provide a releaser 40 for disengaging the locking-pawl. The feed-pawl is normally held out of engagement with the rack, and when the locking-pawl is disengaged from the rack the weight 37 will pull the carriage back to its initial position in one movement. The releaser is arranged to move a limited distance lengthwise on the rail 41, fastened to the main frame, and its movement is limited by a pin 43, fastened to the rail and operating in a slot 43' in the releaser, and it is held constantly under the tension of a flat spring 42. The releaser is located in the path of movement of a lug 44 at the rear end of the rack and a lug 45 at the front end of the rack, and it is provided with a lip 46, which projects across the rack to engage the locking-pawl, and another lip 47, which also projects across the rack to engage the feed-pawl. Until the carriage has reached approximately the limit of its forward movement the releaser performs no function; but in the last step of the movement the lug 44 at the rear end of the rack engages the releaser and pushes it forward. This forward movement of the releaser causes the lip 46 to lift the locking-pawl 29 from engagement with the rack and the lip 47 to lift the feed-pawl 30 out of engagement with the rack also, so that the weight may pull the carriage back to its initial position. On the rearward movement of the carriage the lug 45 will engage the releaser and push it back to its initial position, carrying the lips from beneath the lugs and permitting the locking-pawl to drop down into engagement with the rack.

The pictures are raised one at a time from their storage position in the carriage to display position behind the mirrors by means of a lifter 48, which travels vertically on a guideway 49, fastened to the main frame. This lifter is pivotally connected to an operating-rod 50, which is pivotally connected to a lever 51, pivoted on the main frame at 52 and carrying a roller 53, which rides against the cam 54 on the main shaft. The cam is timed to carry the lifter up into its elevated position and hold it there during the display operation, after which the lifter falls by gravity into position to receive another picture. The lifter is provided with a finger 55, Fig. 15, which engages the projection 26 on the picture-frame, and this finger is preferably grooved or socketed to more securely hold said projection. To insure the return of the picture to storage position in the carriage when the lifter descends, I provide a lug 56 on the lifter above the finger 55, and if the picture-frame should accidentally stick for any reason whatever in display position the lug 56 will engage the projection 26 on the frame when the lifter descends and force the frame to descend. The feeding movement of the carriage moves the picture which has just been displayed forward a step and brings the next picture into display position, and on this movement of the carriage the projection 26 on the next picture to be displayed is carried in between the lug 56 and the finger 55 in position to be engaged by the finger 55 on the upward movement of the lifter.

To prevent accidental feeding movement of the carriage before the picture which has been displayed is returned to storage position in the carriage, I preferably provide that the feed-pawl shall be normally disengaged from the rack and not thrown into engagement therewith until the lifter has returned to its initial or lowered position. The feed-pawl is carried by an arm 57, Fig. 11, which is pivotally mounted in the upper end of the lever 31, and this arm carries also a lever 58, which is provided at one end with a weight 59 and has its other end arranged in the path of movement of the tripper 60 on the lifter. The weight operates to swing the feed-pawl out of engagement with the rack immediately after the lifter starts on its upward movement, and the feed-pawl is thus held out of engagement with the rack until the tripper engages and forces it down into engagement with the rack on the descent of the lifter. I prefer to provide one or more electric lights 61 behind the picture when it is in display position, the light being thrown forward through the picture by a reflector 62 of any suitable constructon. These lights may be arranged in any desired manner, and I provide for turning them out except when the picture is exposed. This is accomplished by means of a switch-lever 63, pivoted on an upright 64 and normally held by spring 65 out of engagement with the contact 66. This lever carries an arm 67, which is forked at its upper end to receive the main shaft. A cam 68 on the main shaft engages a pin 69 on the arm and throws the lever into engagement with the contact 66 to turn the lights on. The main shaft may be driven in any suitable manner and by any suitable power, and I have used an electric motor 70, which is geared to the driving-shaft in the ordinary way.

The machine operates automatically, and in a complete display operation each picture is exposed twice—that is to say, when the mirrors are turned to the horizontal positions $b$ and $d$ in Fig. 4 and illustrated also in broken lines in Figs. 2 and 3. When the mirrors are lapped, as shown in full lines in Figs. 2 and 3 and in position $a$ in Fig. 4, they collectively form a complete mirror and hide the picture. Exposing the picture to the view of the spectator twice is calculated to arouse his curiosity and interest, and in addition to this a kaleidoscopic effect is imparted to each exposure during the movement of the mirrors from one position to another. While the mirrors are moving the picture appears to the spectator in a mutilated state, consisting of a number of parts corresponding to the number of mirrors. In other words, it will appear to the spectator that the picture is composed of a number of moving parts, whereas, as a matter of fact, the mirrors are moving and the picture remains stationary. This imparts a certain amount of mystery to the display, which attracts and holds the attention of the spectator. The apparatus can be used for advertising and other purposes, and it will be understood that I use the term "picture" in the broad generic sense to include advertisements and any subject-matter that is capable of use in the machine.

The operation of the parts is entirely automatic, each picture being carried up and displayed and returned to storage position in the carriage, and after all the pictures have been displayed the carriage is returned to its initial position and the operation repeated as long as the power is applied.

I claim and desire to secure by Letters Patent—

1. In a display apparatus, the combination of a movable carriage, a plurality of pictures stored in said carriage, and means for feeding the carriage forward step by step and comprising a rack on the carriage, a locking-pawl operating on the rack, a feed-pawl normally out of engagement with the rack, means for operating said pawl, and means for throwing the pawl into engagement with the rack.

2. In a display apparatus, the combination of a movable carriage, a plurality of pictures stored in said carriage, and means for feeding the carriage forward step by step and comprising a rack on the carriage, a locking-pawl operating on the rack, a feed-pawl normally out of engagement with the rack, means for operating said pawl, a weighted lever rigid with said feed-pawl, and a tripper for operating said lever to throw the feed-pawl into operative engagement with the rack.

3. In a display apparatus, the combination of a movable carriage, a plurality of pictures stored in said carriage, and means for feeding the carriage forward step by step and comprising a rack on the carriage, a locking-pawl operating on the rack, a feed-pawl normally out of engagement with the rack, means for operating said pawl, a lifter for carrying the pictures one at a time into display position, a tripper on the lifter, and means connected with said feed-pawl and located in the path of movement of the tripper and adapted to be operated by said tripper to throw the feed-pawl into operative engagement with the rack.

4. In a display apparatus, the combination of a movable carriage, a plurality of pictures stored in said carriage, a rack on the carriage, a feed-pawl and a locking-pawl operating on the rack, and a releaser for holding said pawls out of engagement with the rack and operated by the carriage at the limit of its forward movement.

5. In a display apparatus, the combination of a movable carriage, a plurality of pictures stored in said carriage, a rack on the carriage, a feed-pawl and a locking-pawl operating on the rack, a releaser on the rack arranged to hold said pawls out of engagement with the rack and operated by the carriage at the limit of its forward movement, and means for returning the carriage to its initial position.

6. In a display apparatus, the combination of a movable carriage, a plurality of pictures stored in said carriage, a rack on the carriage, a feed-pawl and a locking-pawl operating on the rack, a releaser movably arranged on the rack and adapted to hold said pawls out of engagement with the rack at the limit of the forward movement of the carriage, and lugs on the carriage for operating said releaser.

7. In a display apparatus, the combination of a movable carriage, a plurality of pictures stored in said carriage, a rack on the carriage, a feed-pawl and a locking-pawl operating on the rack, a releaser movably arranged on the rack, lips on said releaser projecting across the rack normally behind the pawls, and a lug on the rack arranged to push said releaser forward and cause said lips to disengage the pawls from the rack.

8. In a display apparatus, the combination of a movable carriage, a plurality of pictures stored in said carriage, a rack on the carriage, a feed-pawl and a locking-pawl operating on the rack, a releaser movably arranged on the rack and provided with lips adapted to engage the pawls, a lug on the rear end of the rack arranged to push the releaser forward to cause said lips to disengage the pawls from the rack, and a lug on the forward end of the rack to return said releaser to its normal position.

9. In a display apparatus, the combination of a movable carriage, a plurality of pictures stored in said carriage, a vertically-operating lifter, a projection on each picture, a finger on the lifter arranged to engage the projection on the picture to carry the picture into display position, and a lug on the lifter above said finger.

ABNER A. PHIPPS.

Witnesses:
WM. O. BELT,
M. A. KIDDIE.